Sept. 17, 1929.   V. G. APPLE   1,728,224
COMBINED MOTOR AND REDUCTION GEAR
Filed July 18, 1927    2 Sheets-Sheet 1
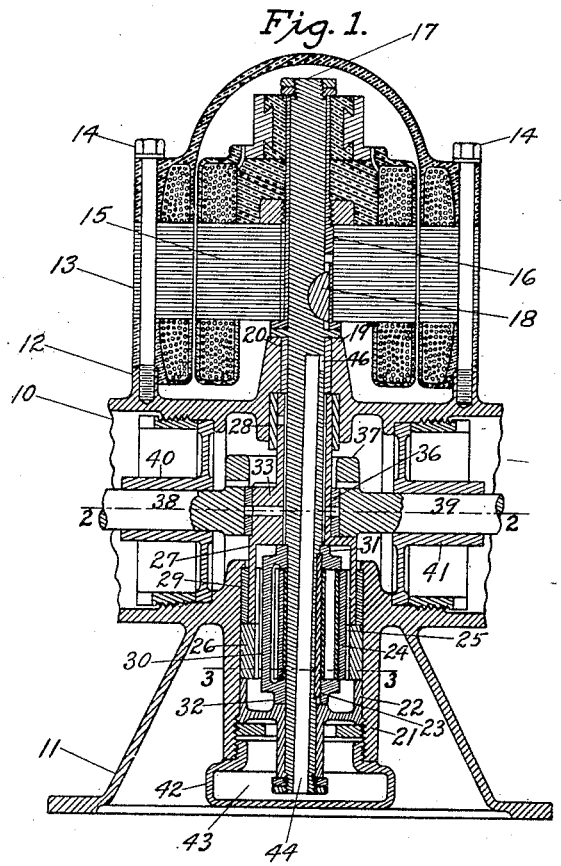
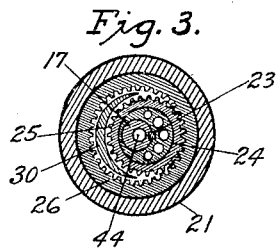
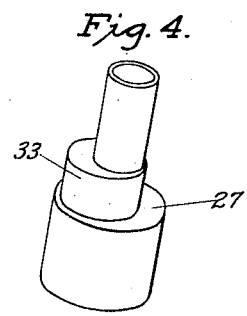
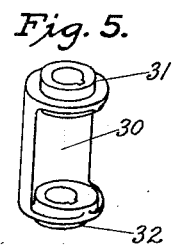
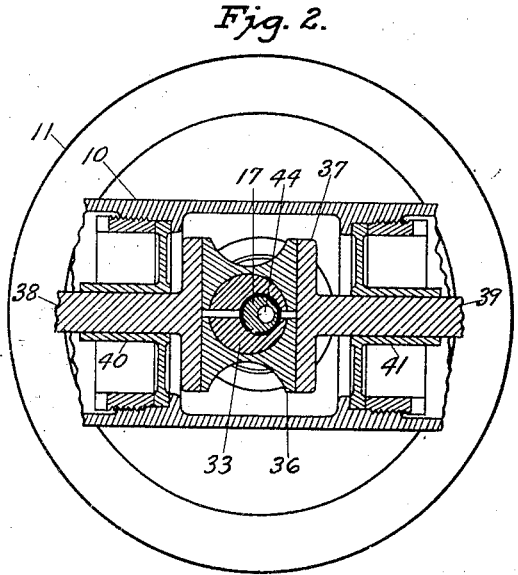
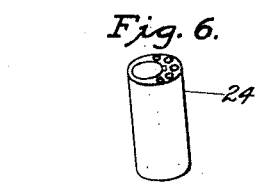
INVENTOR Sept. 17, 1929. V. G. APPLE 1,728,224
COMBINED MOTOR AND REDUCTION GEAR
Filed July 18, 1927 2 Sheets-Sheet 2
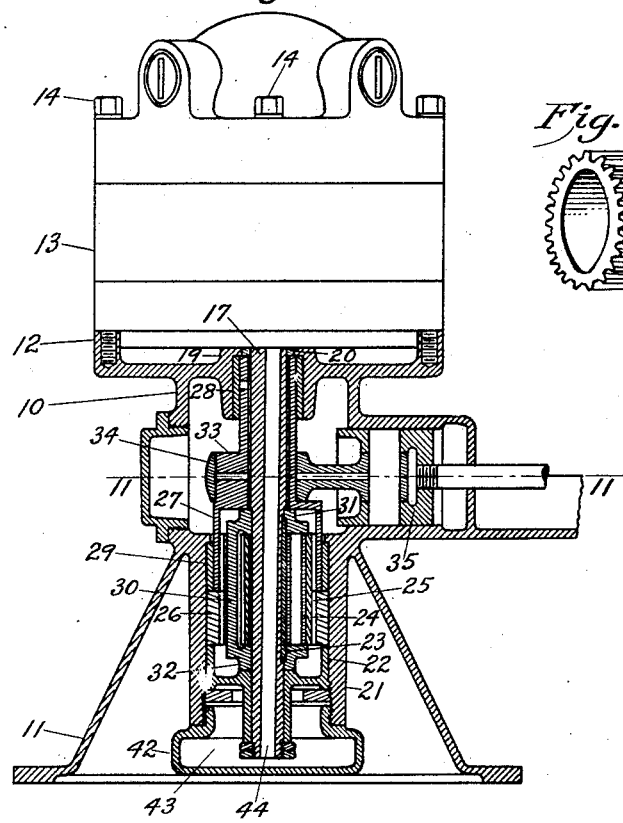
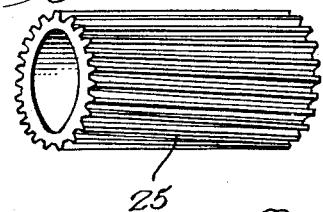
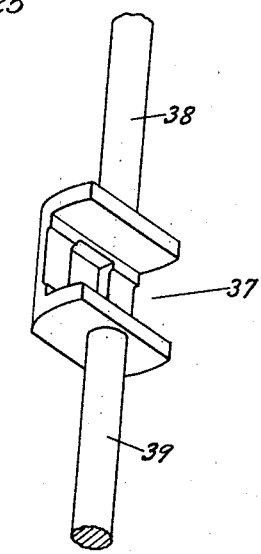
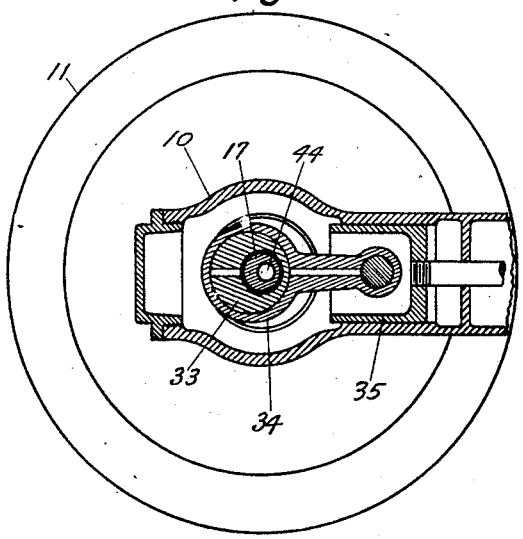
INVENTOR Patented Sept. 17, 1929

1,728,224

UNITED STATES PATENT OFFICE

VINCENT G. APPLE, OF DAYTON, OHIO

COMBINED MOTOR AND REDUCTION GEAR

Application filed July 18, 1927. Serial No. 206,691.

My invention relates to that class of mechanism wherein a relatively high speed motor operates a mechanism requiring considerable reduction in speed, or a reciprocating member, the reciprocations per minute being considerably less than the revolutions of the motor, and while my mechanism herein shown is particularly adapted to a pump, it may be employed in the operation of other reciprocating devices.

An object of my invention is to provide a structure wherein the bearings and gears are so housed that they may be immersed in oil without danger of the oil getting on to the commutator or brushes of the motor.

Another object is to provide gearing of minimum dimensions to give the required reduction.

Still another object is to provide a means of circulating the oil in the housing so as to reach the more remote bearings.

These and other objects are attained in the mechanism illustrated by the accompanying drawings wherein—

Fig. 1 is a longitudinal vertical cross section taken thru a motor embodying my invention where two members of a mechanism are to be reciprocated.

Fig. 2 is a horiozntal cross section taken on line 2—2 of Fig. 1.

Fig. 3 is a horizontal cross section taken on line 3—3 of Fig. 1.

Figs. 4 to 9 inclusive are parts of the mechanism shown in Figs. 1 and 2, but shown in detail.

Fig. 10 is a side view of a mechanism embodying my invention where but one member of a mechanism is to be reciprocated, a portion being shown in section.

Fig. 11 is a horizontal cross section taken on line 11—11 of Fig. 10.

Similar numerals refer to similar parts thruout the several views.

Referring to the drawing a frame 10 has a downwardly extending base portion 11 and an upwardly extending annular ring 12 to which a motor field element 13 is held concentrically secured by bolts 14. An armature 15 on sleeve 16 is secured to shaft 17 by key 18. A hub 19 holds bearing bushing 20 and a relatively larger hub 21 supports bearing member 22. Shaft 17 is free to rotate in bearings 20 and 22.

A key 23 imbedded in shaft 17 causes eccentric 24 to rotate with the shaft. An elongated pinion 25 is placed free to revolve on eccentric 24. Pinion 25 is of sufficient length to mesh with both ring gear 26 and a ring gear member 27 shown in detail in Fig. 4. Ring gear 26 is secured against rotation in hub 21 while ring gear member 27 surrounds but does not touch shaft 17 or have bearing thereon but is free to revolve in bearing bushings 28 and 29 which are secured in hubs 19 and 21 respectively, whereby the drag resulting when the low and high speed members have bearing one upon the other, as in common practice, is eliminated.

The number of teeth in gear 26 differ slightly from the number of teeth in gear member 27. This difference may be one tooth or several teeth. When a difference exists and pinion 25 is rolled around the inner periphery of ring gears 26 and 27 by eccentric 24, the movable ring gear will turn, relative to the stationary ring gear, that part of a revolution equal to their tooth difference divided by the number of teeth in the movable ring gear. Thus, for illustration, if the stationary ring gear 26 had 34 teeth and the movable ring gear member 27 had 35 teeth, then one revolution of the motor shaft 17 would produce one thirty-fifth of a revolution of movable ring gear member 27. Or, if stationary ring gear 26 had 32 teeth and movable ring gear 27 had 36 teeth, then one revolution of the motor shaft 17 would produce four thirty-sixths, or one-ninth of a revolution of movable ring gear member 27. It is apparent that considerable variation in gear ratio may be had with little change in the structure, which broadens the scope wherein the invention is applicable.

It will be noticed that pinion 25 and ring gears 26 and 27 have teeth at a slight helical angle. This angle is such that if shaft 17 is revolved clockwise, viewed from above, gear member 27 and pinion 25, reacting on gear 26, tend to move axially upward. On the other hand gravity tends to cause these gears to move axially downward. By selecting a suitable angle for the gear teeth the two axial forces may be substantially balanced and very little end thrust will be had at any time in either direction, consequently no great amount of end thrust bearing area is required.

Since pinion 25 and eccentric 24 revolve at motor speed an unbalanced effect is produced, and to overcome this effect a balance weight 30 is provided. This balance weight occupies the crescent shaped opening which is left between pinion 25 and ring gears 26 and 27 because of their eccentric relation. Balance weight 30 terminates in hubs 31 and 32 at the ends thereof and is made to rotate with shaft 17 by key 23 so that it is always opposite the unbalanced weight of the eccentric 24 and pinion 25.

Where the slow speed gear member 27 is intended to impart reciprocating movement to other members of the mechanism, the middle part of member 27 is turned eccentric to the remainder, and from this slow speed eccentric the reciprocating movement may be taken. In Figs. 10 and 11 a connecting rod 34 is operated by eccentric 33 to reciprocate cross head 35 from which reciprocating movement may be imparted to pump cylinders, etc., as required. In Figs. 1 and 2 the eccentric 33 operates to reciprocate block 36 and yoke 37. The yoke 37 has oppositely extending shafts 38 and 39 movable in bearings 40 and 41. Shafts 38 and 39 may be employed to operate pump pistons, bellows, etc., or the shafts themselves may be of sufficient diameter to form pump pistons, or they may be otherwise employed to impart reciprocating movement.

A cap 42 closes the lower end of hub 21 after the rotating parts are assembled and adjusted. This cap has considerable space, as at 43, for lubricating oil. A hole 44 extends upwardly thru shaft 17. Hole 44 is subtantially in the center of shaft 17 where it enters at the end, but becomes progressively more eccentric thereto as it extends upward, in consequence of which a continuous supply of oil is moved from space 43 to the upper end of hole 44 where it escapes thru hole 46 into bearing bushing 20 after which gravity carries it first to the other working parts and finally back to the starting point. Since bearings 20 and 22 are widely separated it follows that no bearing at the commutator end of the armature is required and trouble from oil on the commutator is consequently eliminated.

Having described my invention I claim:—

1. A speed reducing mechanism comprising, a frame, bearing hubs in opposte walls of said frame, a shaft having bearings in said hubs and extending from within one said hub thru and beyond the other said hub, driving means on the extending end, a tubular member surrounding said shaft, an internal gear held stationary by said frame, an internal gear carried by said tubular member adjacent the first said gear, a planet pinion meshing with both said gears, and an eccentric secured to said shaft within said pinion, whereby the tubular member is slowly revolved when said shaft is revolved at high speed.

2. A speed reducing mechanism comprising, a frame, bearing hubs in opposite walls of said frame, a shaft supported in said hubs and extending from within one said hub thru and beyond the other said hub, driving means on the extending end, a tubular member surrounding but not touching said shaft, a bearing for said shaft near the outer end of each hub, a bearing for said tubular member near the inner end of each hub, an internal gear held stationary between the two bearings in one said hub, an internal gear carried by the tubular member adjacent said stationary gear, a planet pinion meshing with both said gears, and an eccentric secured to said shaft within said pinion to revolve said pinion, whereby the tubular member is slowly revolved when said shaft is rotated at high speed.

3. A speed reducing mechanism comprising, a frame having a substantially closed compartment, bearing hubs in opposite walls of said compartment, one hub being closed at its outer end and the other being open, a shaft within said compartment having its end extending thru the open hub, means on said extending end to rotate said shaft, a tubular member surrounding but not touching said shaft, a bearing for said shaft in each hub near the outer end, a bearing for said tubular member in each hub near the inner end, an internal gear held stationary between the two bearings in the closed hub, internal gear teeth in the tubular member adjacent said stationary gear, and a planet pinion meshing with both said gears revolved by an eccentric on said shaft, whereby the tubular member is slowly rotated when said shaft is rotated at high speed, all parts of the mechanism requiring oiling being segregated within the said substantially closed compartment.

4. A speed reducing mechanism comprising, a frame having a compartment containing a supply of oil, a bearing hub in the bottom of said compartment closed at its lower end, an open bearing hub in the top of said compartment thru which a vertical shaft within said compartment may extend without other means to retain said oil, means overhung on said extended end to rotate said shaft, a tubular member surrounding but not touching said shaft, a bearing for said shaft in each hub near the outer end, a bearing for said tubular member in each hub near the inner end, an internal gear held stationary between the two bearings in the bottom hub, internal gear teeth in the tubular member adjacent said stationary gear, and a planet pinion meshing with both said gears revolved by an eccentric on said shaft, whereby the tubular member is slowly rotated when said shaft is rapidly rotated, all parts of the mechanism requiring oil being within the said compartment.

5. A combined electric motor and speed reducing gear comprising, a frame having an oil tight compartment, a bearing hub in the bottom of said compartment closed at its outer end, an open bearing hub in the top of said compartment, a vertical shaft within said compartment extending upwardly thru said open hub, an electric motor armature and a commutator mounted on said extending end of said shaft, there being no bearing supporting said shaft at its outer end, whereby oil is kept away from the commutator, an electric motor field element mounted on said frame in concentric relation to said shaft, a tubular member surrounding but not touching said shaft, a bearing for said shaft in each hub near the outer end, a bearing for said tubular member in each hub near the inner end, an internal gear held stationary between the two bearings in the bottom hub, internal gear teeth in the tubular member adjacent said stationary gear, a planet pinion meshing with both said gears revolved by an eccentric on said shaft and means on said tubular member to impart slow movement to other mechanism.

In testimony whereof I hereunto subscribe my name.

VINCENT G. APPLE.